(12) United States Patent
Chen et al.

(10) Patent No.: US 8,625,265 B2
(45) Date of Patent: Jan. 7, 2014

(54) FLAT PANEL DISPLAY

(75) Inventors: Ching-Jou Chen, New Taipei (TW); Wen-Chieh Wang, New Taipei (TW); Chin-Ming Chen, New Taipei (TW); Qi-Xuan Hong, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 165 days.

(21) Appl. No.: 13/418,361

(22) Filed: Mar. 13, 2012

(65) Prior Publication Data
US 2013/0114190 A1 May 9, 2013

(30) Foreign Application Priority Data
Nov. 7, 2011 (TW) .............................. 100140619 A (51) Int. Cl.
*G06F 1/16* (2006.01)
(52) U.S. Cl.
USPC ................... 361/679.21; 347/108; 248/442.2; 345/204
(58) Field of Classification Search
USPC ............... 347/2, 108, 33, 47, 40; 361/679.01, 361/679.21, 679.06, 679.27, 679.05, 361/679.57, 679.07, 679.04, 679.29, 361/679.22, 679.59, 679.55, 679.33; 248/398, 220.22, 289.11, 74.1, 121, 248/125.7, 288.11, 442.2; 345/618, 690, 345/87, 204, 102, 168, 170, 157, 173, 156, 345/166, 158, 633; 16/233, 337
See application file for complete search history.

(56) References Cited

U.S. PATENT DOCUMENTS

| | | | |
|---|---|---|---|
| 2008/0067314 A1* | 3/2008 | Li et al. .......................... | 248/398 |
| 2012/0274682 A1* | 11/2012 | Silverbrook ...................... | 347/2 |
| 2013/0094127 A1* | 4/2013 | Lu ............................. | 361/679.01 |

* cited by examiner

*Primary Examiner* — Hung Duong
(74) *Attorney, Agent, or Firm* — Altis Law Group, Inc.

(57) ABSTRACT

A flat panel display includes a housing, a support base, a support plate, a connecting plate, and a fixing element. The housing defines a sliding groove and a plurality of holes arranged in a line parallel to the extending direction of the sliding groove. The support plate is fixed at the support base. The connecting plate is rotatably connected with the support base. A protruding part is formed on the connecting plate and is sliably received in the sliding groove. The connecting plate further defines a through hole. The fixing element extends through the through hole and is inserted into one of the holes to fix the position of the connecting plate relative to the housing.

10 Claims, 8 Drawing Sheets

FLAT PANEL DISPLAY

BACKGROUND

1. Technical Field

The present invention relates to a flat panel display.

2. Description of Related Art

A display of related art may include a housing, a display panel received in the housing, a support, and a pillar connecting the support to the housing. The pillar is rotatably connected to the housing for adjusting the viewing angle of the display panel received in the housing. However, the height of the display panel is not adjustable. In another kind of the display, the pillar is retractably mounted in the support and the height of the display panel is adjustable. However, a stop mechanism and a sliding mechanism must then be added in the support, and the structure of the display device becomes complex. Neither of the above mentioned displays are easy to disassemble.

What is needed, therefore, is a flat panel display, which could overcome the limitations described above.

BRIEF DESCRIPTION OF THE DRAWINGS

Many aspects of the embodiments can be better understood with reference to the drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
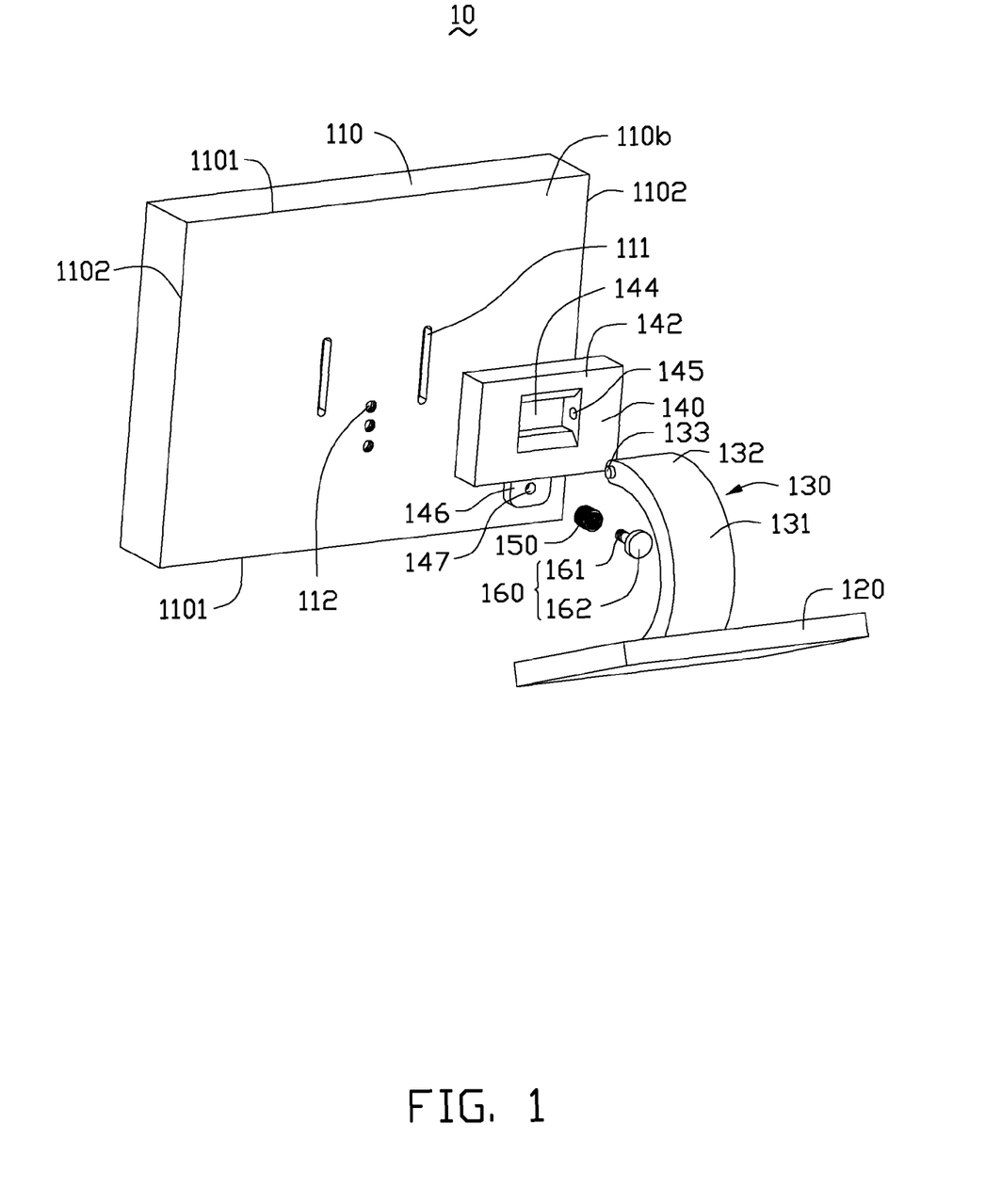
FIG. 1 is an exploded view of a flat panel display according to a first embodiment.
Figure 2:
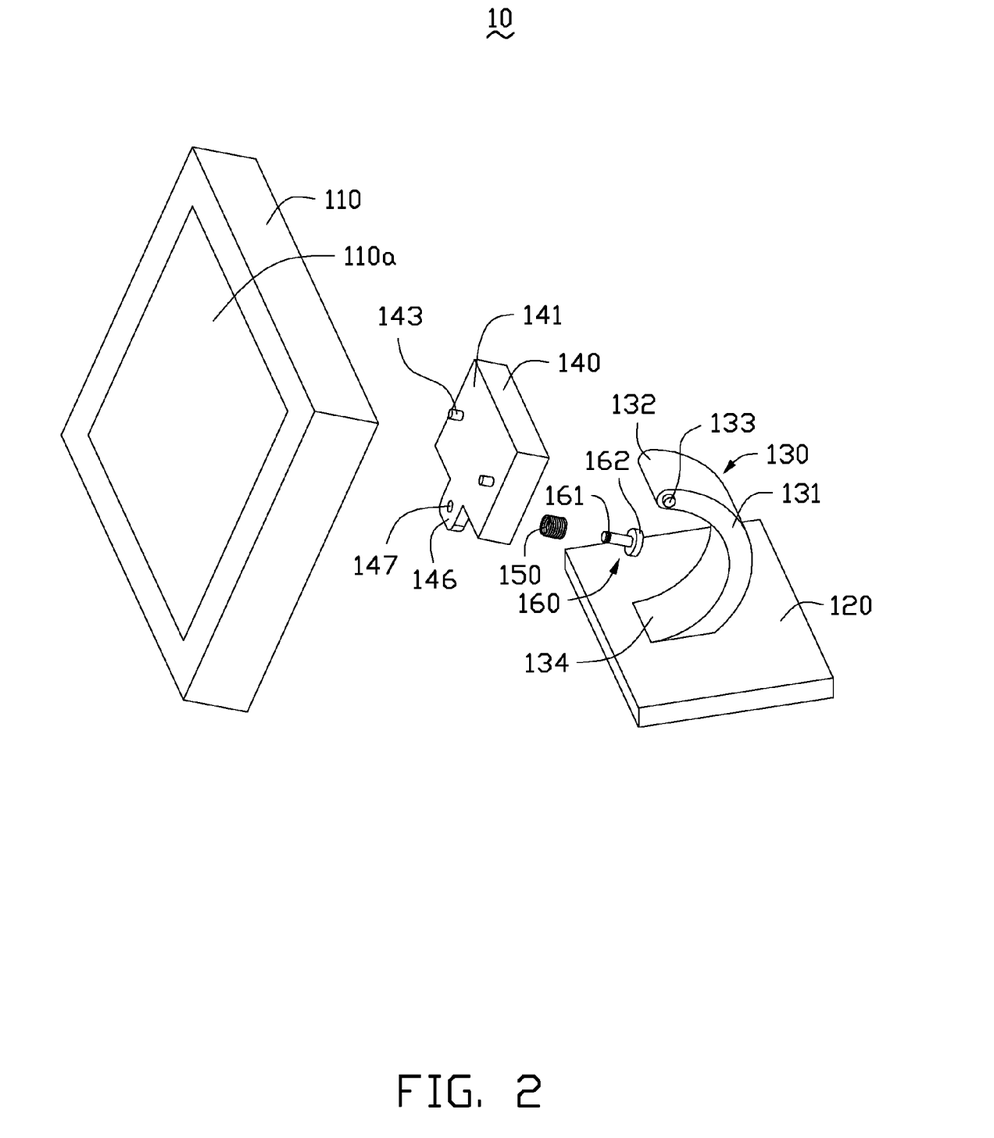
FIG. 2 is similar to FIG. 1, but viewed from another angle.
Figure 3:
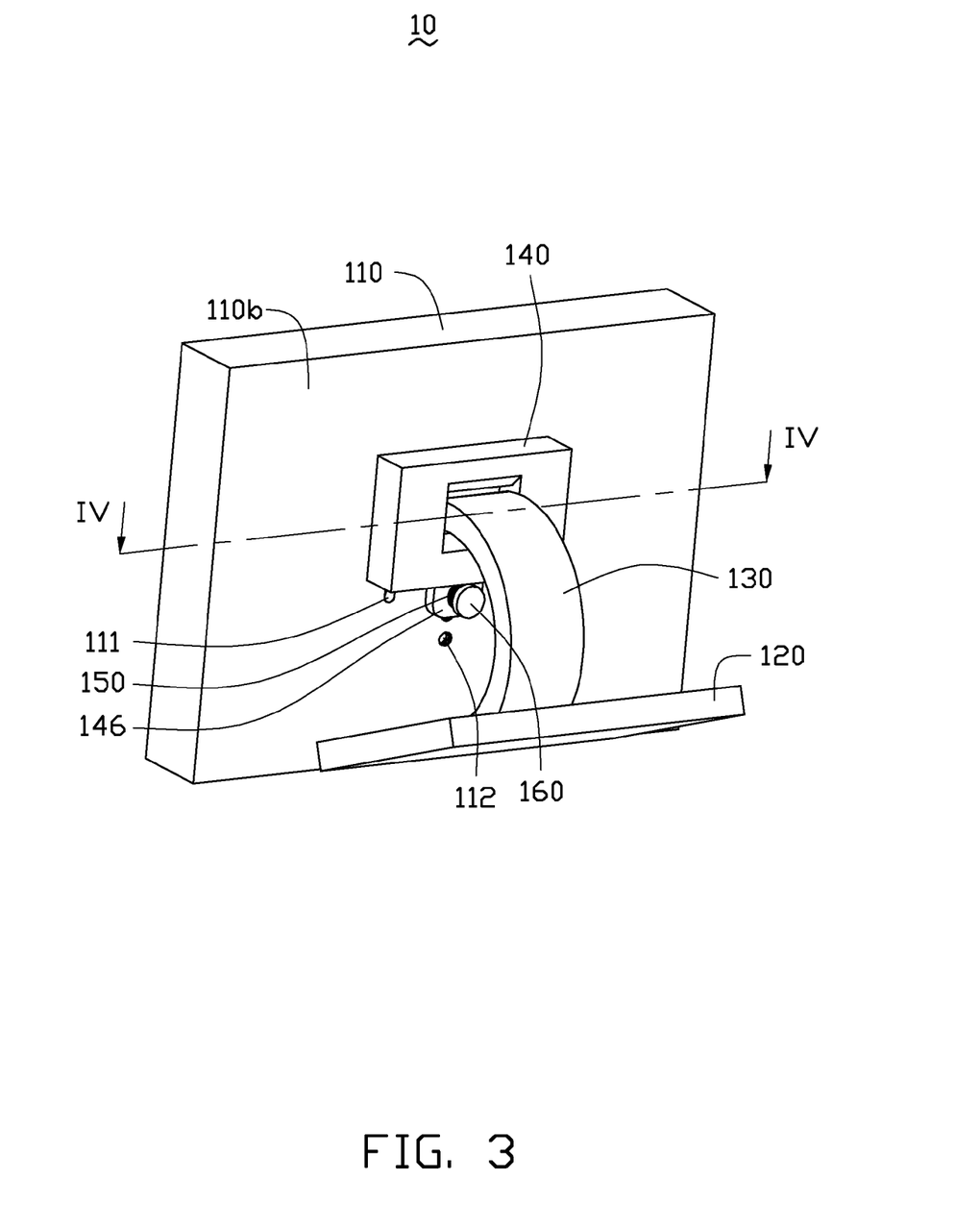
FIG. 3 is an isometric view of the flat panel display of FIG. 1.
Figure 4:
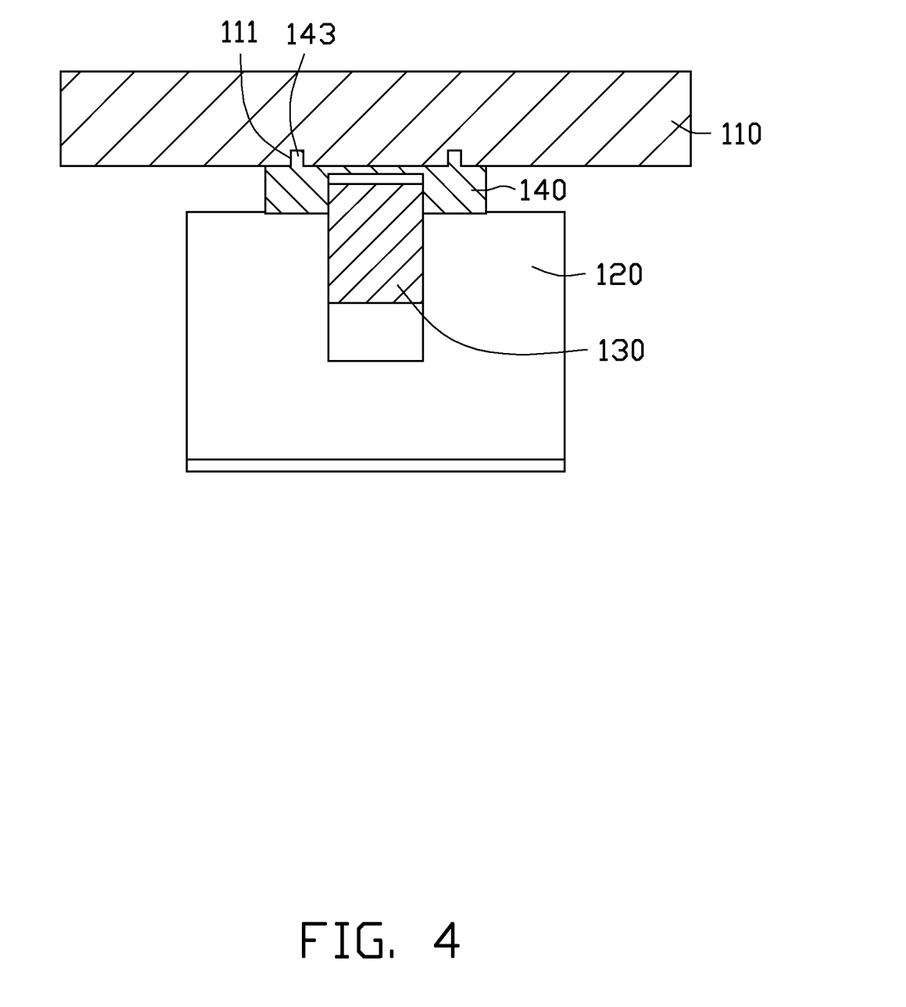
FIG. 4 is a sectional view taken along line IV-IV of the flat panel display of FIG. 3.

Referring to FIGS. 1 to 4, a flat panel display 10 according to a first embodiment is shown. The flat panel display 10 includes a housing 110, a support base 120, a support plate 130, a connecting plate 140, a spring 150, and a bolt 160.

The housing 110 is substantially rectangular. The housing 110 includes two parallel first sides 1101 and two parallel second sides 1102. The housing 110 includes a front surface 110a and an opposite back surface 110b. The back surface 110b defines two sliding grooves 111 and at least three screw holes 112. The two sliding grooves 111 extend along a direction parallel to the second sides 1102. The length of the two sliding grooves 111 is equal to each other. The three screw holes 112 are positioned between the two sliding grooves 111 and disposed in a line parallel to the sliding grooves 111.

The support base 120 is substantially rectangular. The support plate 130 is integral with the support base 120. The support plate 130 includes an arc-shaped main body 131 and two connection rods 133. The arc-shaped main body 131 includes a first end 134 and a second end 132. The connection rods 133 are at opposite side surfaces of the second end 132. The two connection rods 133 are coaxial to each other.

The connecting plate 140 is T-shaped. The connecting plate 140 includes a front surface 141 and an opposite back surface 142. Two sliding rods 143 protrude from the front surface 141. The two sliding rods 143 are inserted into the two sliding grooves 111 and may slide in the grooves 111. The back surface 142 defines a groove 144. Two opposite pivot holes 145 are defined in inner walls of the groove 144. The second end 132 of the support plate 130 is received in the groove 144 and the two connection rods 133 are rotatably inserted into the pivot holes 145. The connecting plate 140 further includes a protruding portion 146. The protruding portion 146 defines a through hole 147.

The bolt 160 includes a threaded shaft 161 and a cap 162. The spring 150 is sleeved over the threaded shaft 161. The threaded shaft 161 extends through the through hole 147 and is inserted into one of the screw holes 112, thus securing the connecting plate 140 on the housing 110.

The housing 110 is rotatable around the second end 132 to adjust the viewing angle of the display device 10. The bolt 160 can be inserted into different screw holes 112 to secure the display 10 at different heights. When detaching the display 10, the bolt 160 is loosened from the screw hole 112, and the housing 110 is removable from the connecting plate 140.

Figure 5:
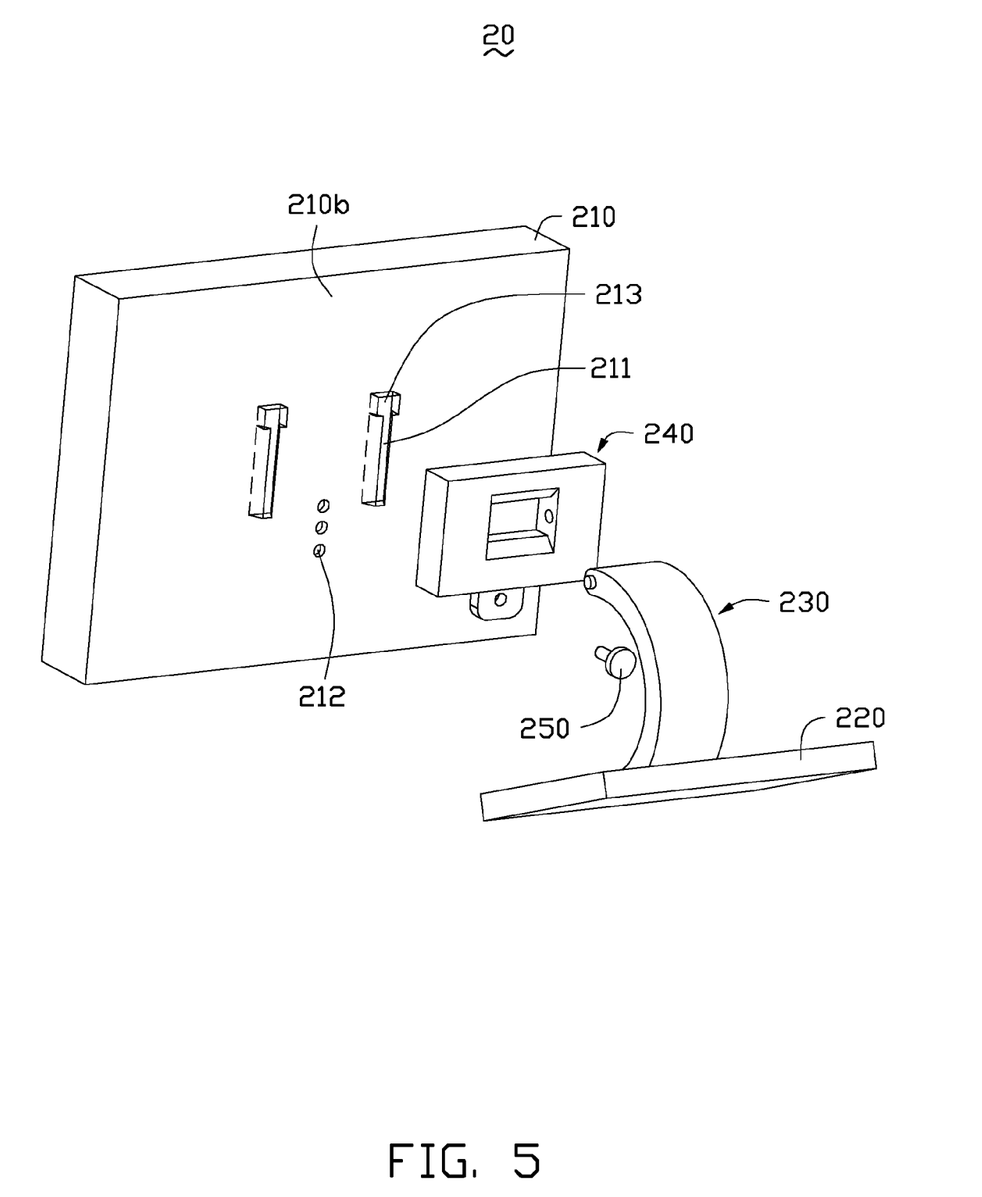
FIG. 5 is an exploded view of a flat panel display according to a second embodiment.
Figure 6:
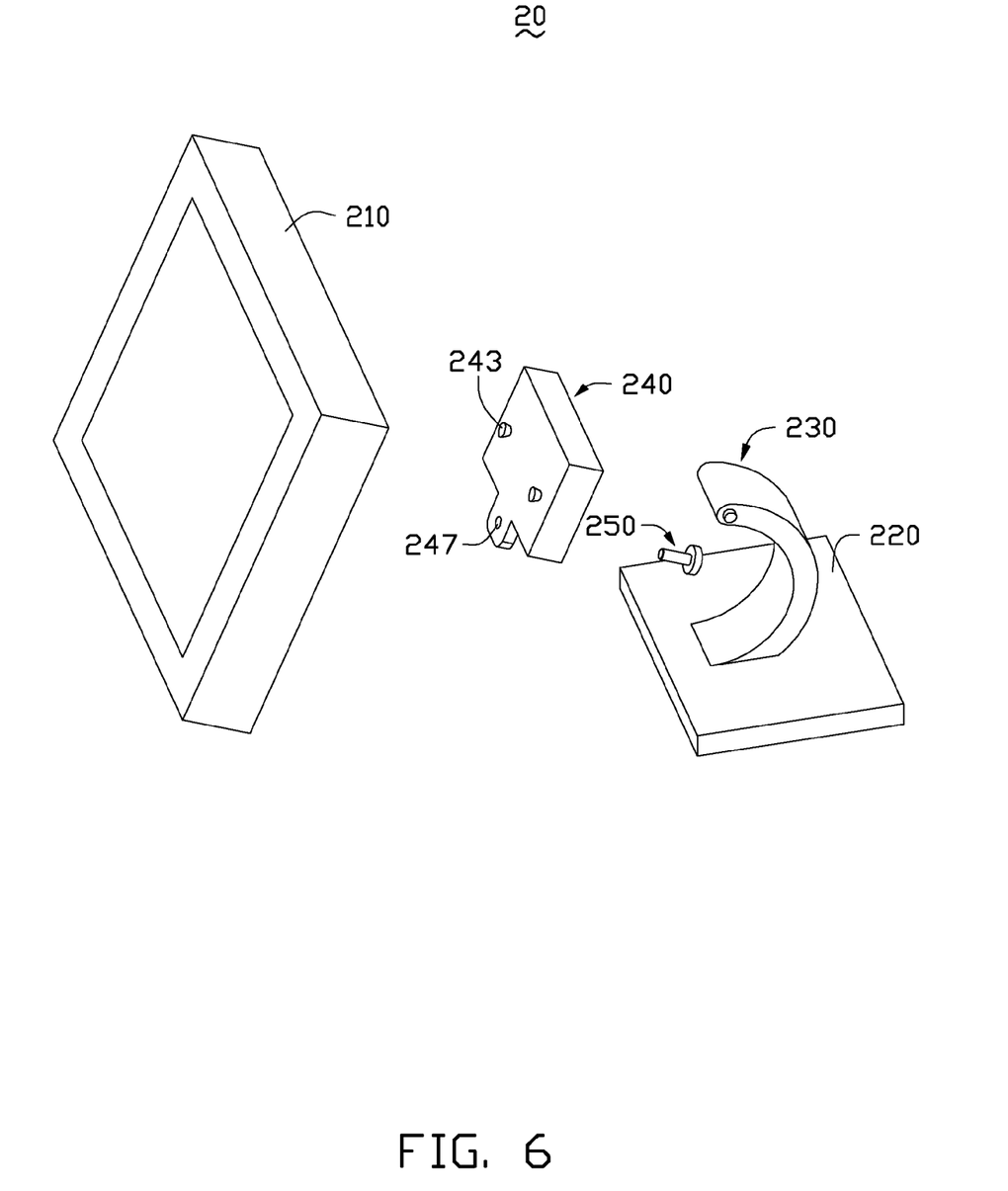
FIG. 6 is similar to FIG. 5, but viewed from another angle.
Figure 7:
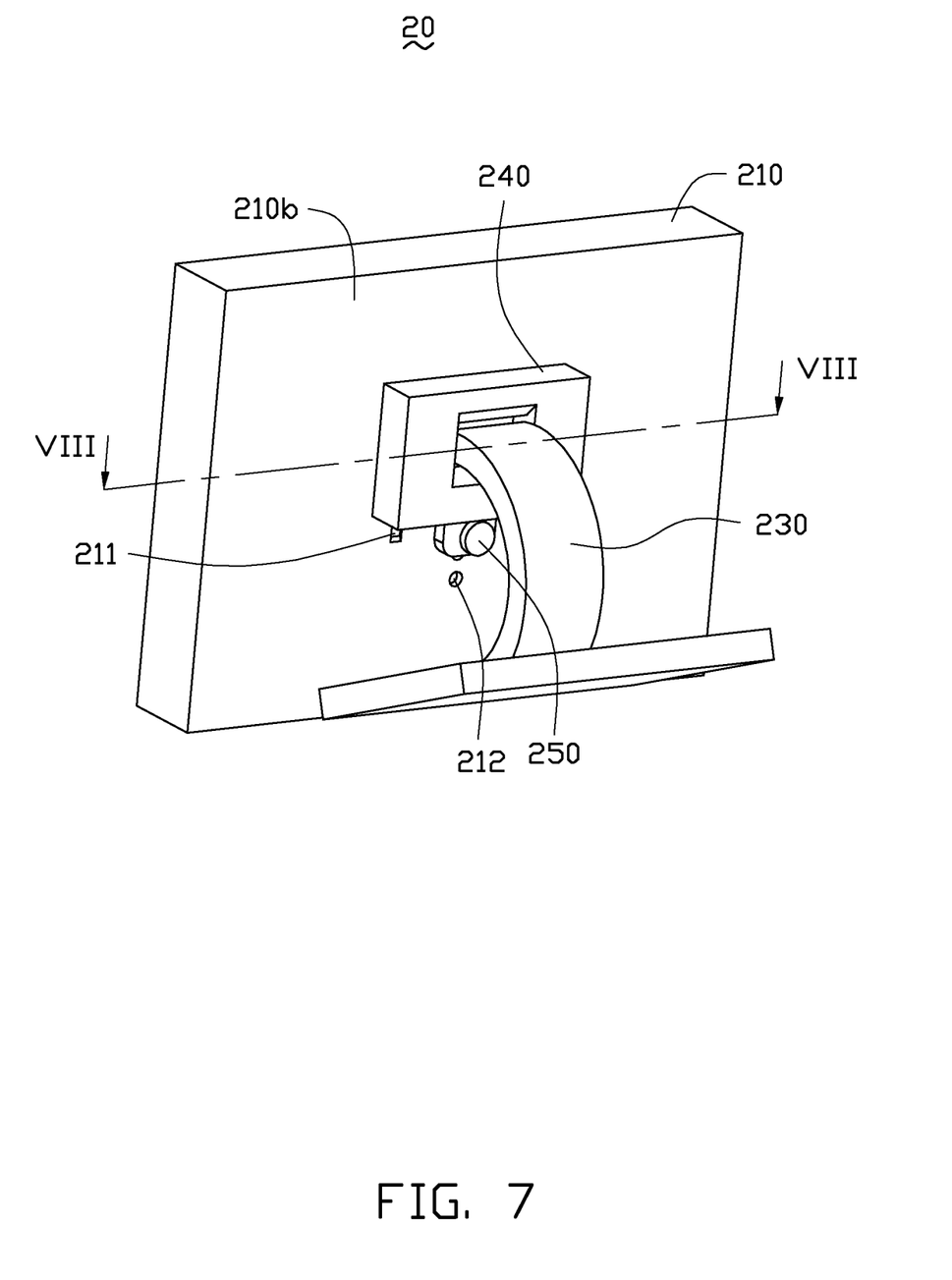
FIG. 7 is an isometric view of the flat panel display of FIG. 5.
Figure 8:
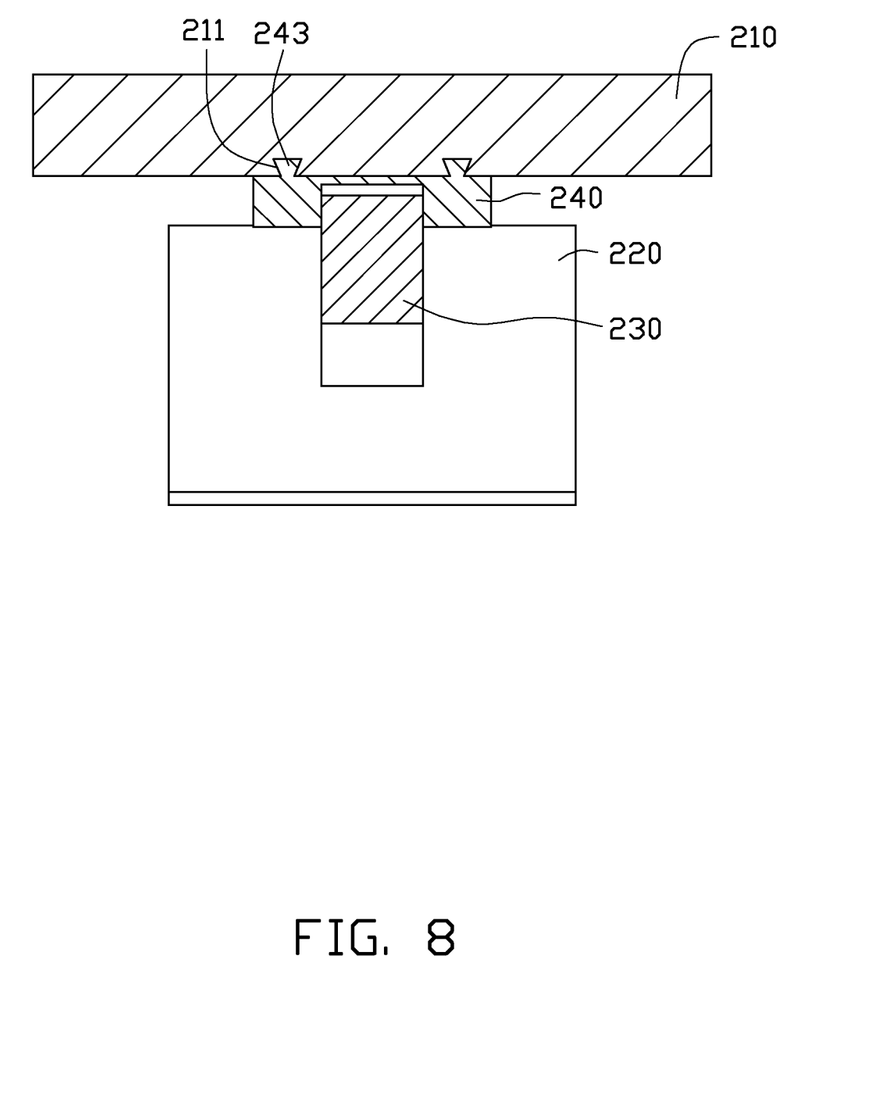
FIG. 8 is a sectional view taken along line VIII-VIII of the flat panel display of FIG. 7.

Referring to FIGS. 5 to 8, a flat panel display 20 according to a second embodiment is shown. The flat panel display 20 includes a housing 210, a support base 220, a support plate 230, a connecting plate 240, and a pin 250.

The display 20 is similar to the display 10, but the structure of the display 20 includes two sliding grooves 211 defined in the housing 210 and two wedges 243 formed on the connecting plate 240.

The two sliding grooves 211 are defined in a back surface 210b of the housing 210. A cross-sectional surface of each sliding groove 211 perpendicular to the extending direction of the sliding groove 211 is trapezoidal in shape and has a long side farthest from the back surface 210b. One end of each sliding groove 211 is a cutout 213. The width of the cutout 213 is equal to that of the long side of the cross-sectional surface of the sliding groove 211. Each wedge 243 has a cross-sectional surface substantially identical to the cross-sectional surface of each sliding groove 211 perpendicular to the extending direction of the sliding groove 211. The wedges 243 are inserted into the sliding grooves 211 from the cutouts 213, to connect the housing 210 and the connecting plate 240. The wedges 243 are slidable along the sliding grooves 211. The pin 250 extends through a through hole 247 defined in the connecting plate 240, and is inserted into one of three holes 212 defined in the housing 210, to fix the position of the connecting plate 240 relative to the housing 210.

It will be understood that the above particular embodiments are shown and described by way of illustration only. The principles and the features of the present disclosure may be employed in various and numerous embodiments thereof without departing from the scope of the disclosure. The above-described embodiments illustrate the scope of the disclosure but do not restrict the scope of the disclosure.

What is claimed is:

1. A flat panel display, comprising:
   a housing comprising a back surface, wherein the back surface defines at least one sliding groove and a plurality of holes, and the plurality of holes are arranged in a line parallel to the extending direction of the at least one sliding groove;
   a support base;

a support plate comprising a first end and an opposite second end, wherein the first end is fixed on the support base;

a connecting plate comprising a front surface and a back surface, wherein the second end of the support plate is rotatably connected with the connecting plate at the back surface, the connecting plate comprises at least one protruding part positioned on the front surface, each of the at least one protruding part is sliably received in a respective one of the at least one sliding groove, the connecting plate further defines a through hole; and a fixing element extending through the through hole and inserted into one of the plurality of holes to fix the position of the connecting plate relative to the housing.

2. The flat panel display of claim 1, wherein the back surface defines a groove, two opposite pivot holes are defined in inner wall of the groove, two opposite connection rods are formed on the second end of the support plate, the second end is received in the groove, the connection rods are rotatably inserted in the pivot holes.

3. The flat panel display of claim 2, wherein the support plate is arc-shaped.

4. The flat panel display of claim 1, wherein the fixing element is a bolt, the plurality of holes are threaded holes, the bolt is screwed into one of the plurality of holes.

5. The flat panel display of claim 4, further comprising a spring sleeved over the bolt.

6. The flat panel display of claim 1, wherein a cross-sectional surface of the at least one sliding groove perpendicular to the extending direction of the at least one sliding groove is in the shape of trapezoid, each of the at least one protruding part is a wedge.

7. The flat panel display of claim 6, wherein one end of each of the at least one sliding groove is a cutout, the at least one protruding part is inserted into the at least one sliding groove through the cutout.

8. The flat panel display of claim 6, wherein each of the at least one protruding part has a cross-sectional surface substantially identical to the cross-sectional surface of the at least one sliding groove perpendicular to the extending direction of the at least one sliding groove.

9. The flat panel display of claim 6, wherein the fixing element is a pin.

10. The flat panel display of claim 1, wherein each of the at least one protruding part is a sliding rod protruding from the front surface.

* * * * *